United States Patent [19]
Probst

[11] Patent Number: 4,746,104
[45] Date of Patent: May 24, 1988

[54] HYDRAULIC EXHAUST PIPE HANGER MOUNT

[75] Inventor: Edward P. Probst, Dayton, Ohio

[73] Assignee: General Motors Corporation, Detroit, Mich.

[21] Appl. No.: 938,808

[22] Filed: Dec. 8, 1986

[51] Int. Cl.$^4$ .................. F16F 15/04; B60K 13/04; E21F 17/02

[52] U.S. Cl. .................. 267/140.1; 180/89.2; 180/309; 248/60; 267/219; 267/294

[58] Field of Search .............. 267/8 R, 8 B, 35, 63 R, 267/113, 120, 136, 140.1, 152, 153, 217, 219, 256, 257, 292, 294; 180/300, 312, 296, 309, 89.2; 248/60, 611, 49, 58, 562, 638, 636

[56] References Cited

U.S. PATENT DOCUMENTS

| 1,964,008 | 6/1934 | Roberts | 267/35 |
| 4,469,316 | 9/1984 | van den Boom et al. | 267/140.1 |

FOREIGN PATENT DOCUMENTS

| 0223012 | 11/1958 | Australia | 248/562 |
| 0153743 | 7/1938 | Austria | 267/63 R |
| 0115174 | 8/1984 | European Pat. Off. | 248/562 |
| 2524951 | 10/1983 | France | 267/140.1 |

*Primary Examiner*—Andres Kashnikow
*Assistant Examiner*—Robert J. Oberleitner
*Attorney, Agent, or Firm*—Ronald L. Phillips

[57] ABSTRACT

A hydraulic mount assembly includes a pair of mounting members and a first resilient body member and a second resilient body member connected thereto, each body member preferably being substantially bell shaped and forming a cavity. The two body members are connected with the cavities facing each other and separated by an orifice plate to form a closed chamber. A decoupler is mounted in the plate to provide the desired damping action. The body members are preferably molded of elastomeric material, such as rubber, with the first wall portion of the first body exhibiting relatively high stiffness, a second wall portion exhibiting relatively low stiffness and the second body including a third wall portion exhibiting relatively intermediate stiffness. Preferably, the ratio of the three stiffness ratings is 2:0.25:1. In operation, under dynamic loading, the stiff portion of the first body does not allow any dimension change in the longitudinal direction. Consequently, the relatively less stiff second body is caused to stretch or bulge under tensile or compressive loading, respectively. As this occurs, the volume of the second cavity is decreased or increased accordingly causing the appropriate exchange of fluid between the cavities through the orifice. The second portion of the first body accomodates this exchange by flexing inwardly or bulging outwardly depending on the decrease or increase of hydraulic fluid in that cavity.

4 Claims, 2 Drawing Sheets

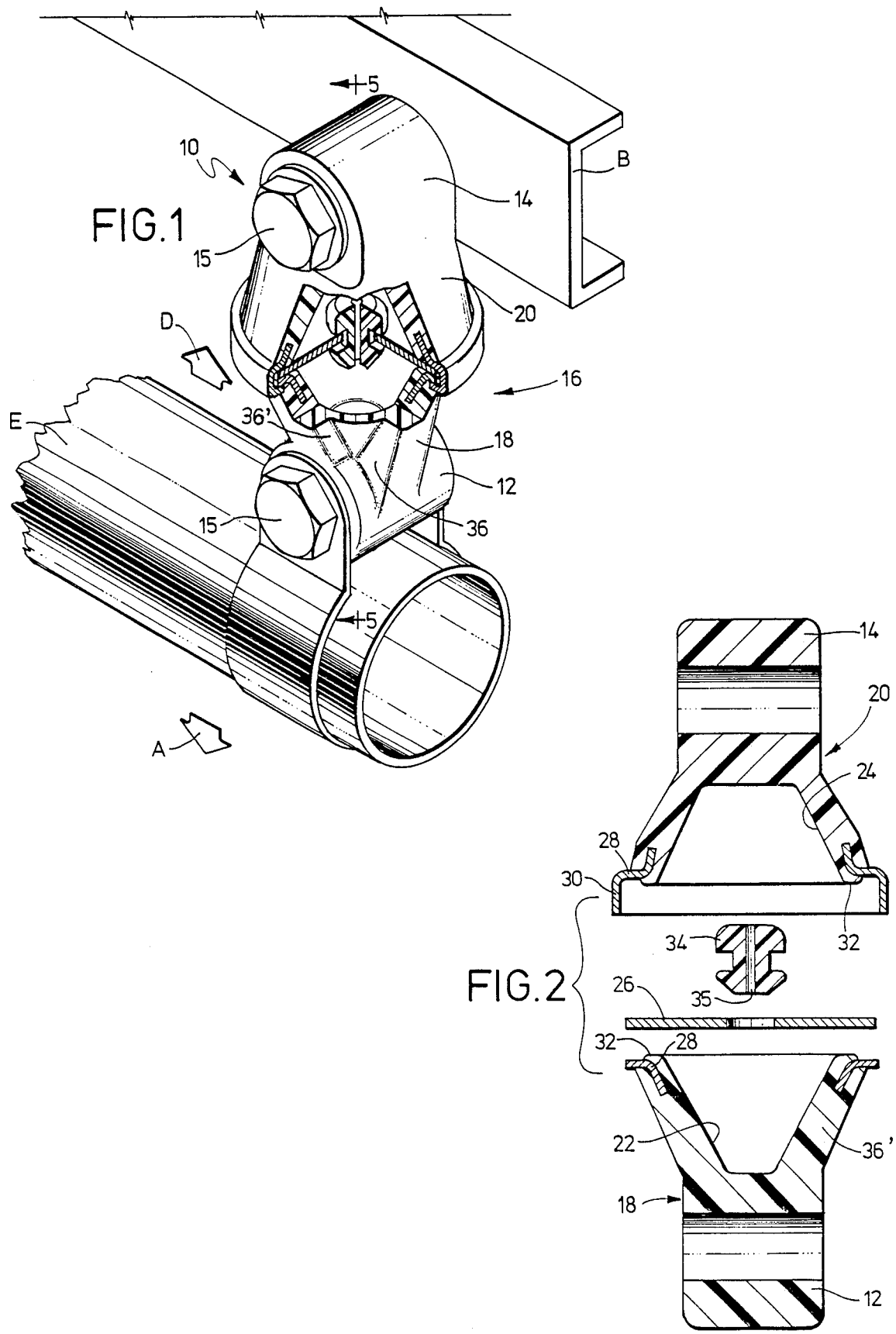

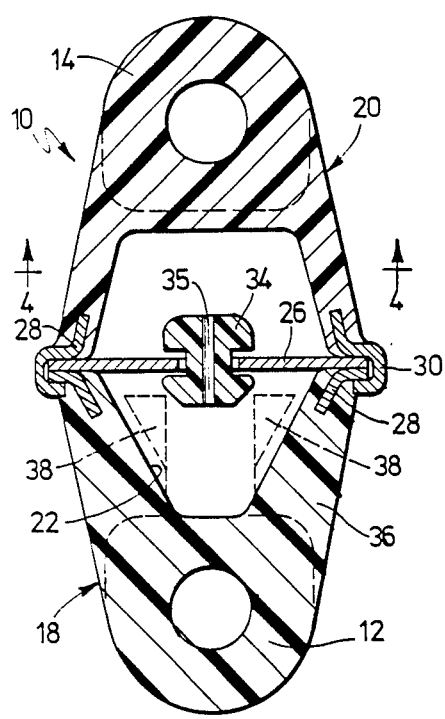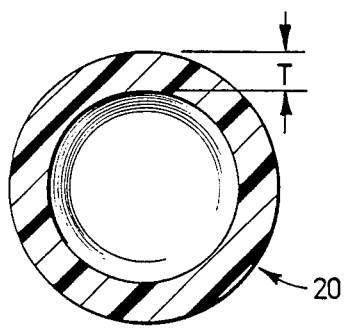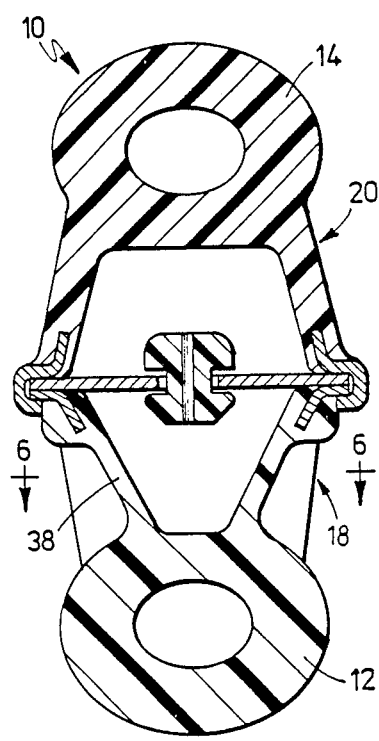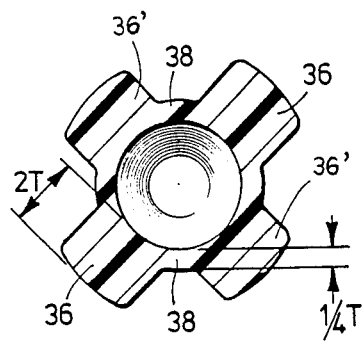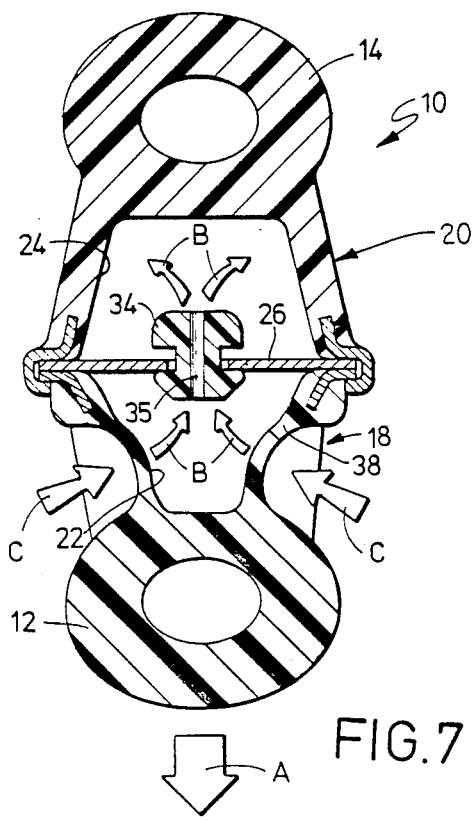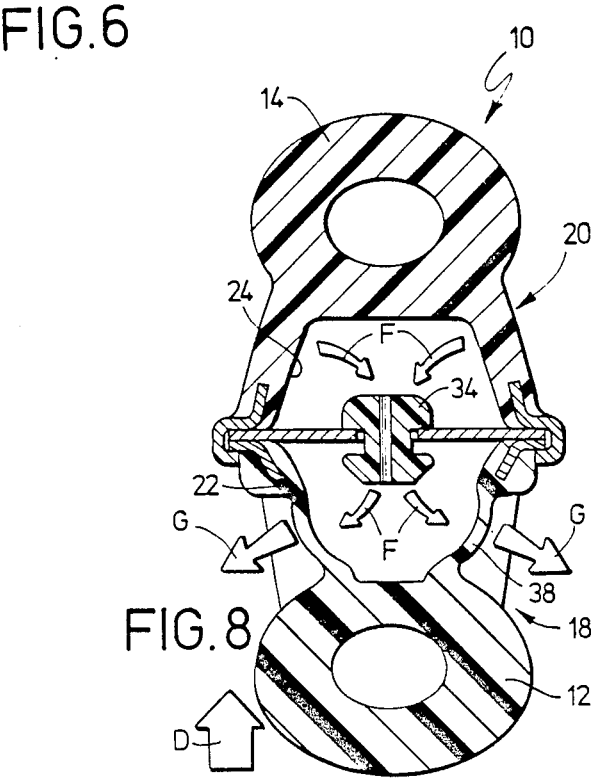

HYDRAULIC EXHAUST PIPE HANGER MOUNT

TECHNICAL FIELD

The present invention relates generally to hydraulic mount assemblies and, more particularly, to a mount assembly of simple, low cost construction that provides improved damping performance and operating characteristics.

BACKGROUND OF THE INVENTION

A number of recent advances have led to increased utilization of hydraulic mount assemblies to support internal combustion engines in motor vehicles. The assemblies normally include two mounting members connected together by an elastomeric body. A damping chamber filled with liquid is formed in this body. An orifice plate divides this chamber into two cavities. The first cavity is formed between the orifice plate and the elastomeric body. The second cavity is formed between the orifice plate and a separate expandable diaphragm received within a base member of one of the mounting members.

Engine and/or road vibrations at prescribed frequencies and amplitudes that are transmitted to the mount assembly cause the elastomeric body to alternatively compress and stretch. This causes a change of volume in the first cavity. As the first cavity decreases in volume on compression of the assembly, the damping liquid that fills the cavity is forced through the restricted orifice into the second cavity thereby causing the diaphragm to expand. Upon reversal of the vibration input force, the assembly stretches longitudinally and the first cavity increases in volume. As a result, damping liquid flows back through the restricted orifice into the first cavity, thus causing the diaphragm to contract. This two-step process completes the damping cycle.

Where variable damping is desired (such as high damping at large amplitudes, and no damping at small amplitudes) a decoupler is provided in the orifice plate between the cavities (see, for example, copending commonly assigned U.S. patent application Ser. No. 785,243, filed Oct. 7, 1985 entitled Hydraulic-Elastomeric Mount Displacement Decoupler and now U.S. Pat. No. 4,664,363). The decoupler effects a volume displacement in the cavities so that no fluid flows through the restricted orifice at the prescribed low amplitude levels.

By varying the size and shape of the decoupler and/or the orifice in the decoupler, the engine mount assembly can be tuned so that the hydraulic damping effects a better match to the particular vibrations anticipated. This passive tuning of the mount assembly substantially increases its usefulness and overall effectiveness. To provide additional efficiency in controlling vibrations under an even greater range of conditions, a more recent development provides for active, infinitely variable control (see copending commonly assigned U.S. patent application Ser. No. 929,328 filed Nov. 10, 1986, entitled Variable Hydraulic Elastomeric Mount Assembly). For the engine, which is the main vibration inducing component of the vehicle, the selection of one of these prior art mount assemblies, that is, with or without active control, is the optimum choice.

On the other hand, there are other auxiliary systems or components of the vehicle that also call for vibration isolation if the smoothest and quietest ride is to be obtained. One approach is to provide a completely redesigned hydraulic mount that relies on the exchange of liquid through variable size orifices between substantially concentric chambers (see commonly assigned U.S. patent application Ser. No. 875,187, filed June 17, 1986, entitled Hydraulic Mount). While this prior approach is generally successful for auxiliary equipment, there is technical evidence available that utilizing a design with dual cavities separated by an orifice plate, similar to the basic design used by the engine mounts, would be particularly advantageous.

However, research has proven that the engine mount assemblies are not suitable for these smaller components, such as the muffler and tail pipe, for several reasons. First, the amplitude and frequency range to be damped varies sufficiently to substantially preclude simple adaptation of these prior devices. Secondly, in the case of an exhaust system, a hanger rather than a base type support is better suited to the overall engineering needs to the vehicle. Also, in addition to involving a different dynamic range, there is substantially less weight to be supported. Thus, the mount for auxiliary systems or components calls for a different, but similar, basic design, and advantageously one that is simpler and more economical to manufacture.

SUMMARY OF THE INVENTION

A primary object of the invention is to provide a hydraulic mount assembly of simple, low cost construction particularly adapted for use with auxiliary equipment on a motor vehicle.

Another object of the present invention is to provide a hydraulic mount assembly that utilizes a design similar to the engine mount, but is constructed and passively tuned to provide maximum damping effects at the particular vibration frequencies and amplitudes of auxiliary equipment, so as to produce improved performance and operating characteristics.

Still another object of the present invention is to provide a new and improved hydraulic mount assembly with simplified structure and dynamic rate and damping characteristics optimized to support and position an exhaust system relative to a motor vehicle body, and thereby reduce the transfer of noise and vibration from the exhaust system to the passenger compartment.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved hydraulic mount assembly is provided for supporting an exhaust system of a motor vehicle. The assembly is of a hanger-type and includes a pair of mounting members. The mounting members are connected by conventional means, including metal brackets and bolts, to the exhaust system and the underside of the motor vehicle. A hollow resilient or elastomeric body connects the mounting members and forms a closed chamber that is filled with damping liquid. This resilient body is formed by two molded body members that are joined together. An orifice plate, disposed between the body members, divides the chamber into first and second communicating cavities. The first cavity is formed between the orifice plate and the first body member defined by alternating first wall portions of relatively high stiffness and second wall portions of relatively low stiffness. The second cavity is formed between the orifice plate and the second body member that includes a third wall portion of relatively intermediate stiffness.

The mount assembly is dynamically loaded by reciprocal movement of the exhaust system relative to the vehicle body. The stiff portion of the first body prevents any dimension change in the first body member in the longitudinal direction. Consequently, the second body portion of relatively intermediate stiffness is caused to stretch under tensile loading and bulge under compressive loading, respectively. As this occurs, the volume of the second cavity is decreased or increased. This change in volume causes an appropriate exchange of fluid between the cavities through a restricted orifice in the orifice plate. The second wall portion of the first body member accommodates this exchange of fluid by flexing inwardly or bulging outwardly depending on the decrease or increase of hydraulic fluid in the first cavity. In this way the hydraulic mount assembly advantageously effects a level of damping best suited to isolate vibrations of an exhaust system from the passenger compartment of a motor vehicle.

In accordance with a further aspect of the present invention, the assembly may also include a decoupler mounted for reciprocal movement in the orifice plate within the damping liquid chamber. This movement preempts fluid flow between the cavities for small amplitude vibrations so that the assembly produces little or no damping effects at these levels. At large amplitudes the decoupler travels to its fullest extent and becomes seated against the orifice plate. Fluid flow is then produced through the orifice between the cavities so as to effect the desired fluid damping. Passive tuning of the damping is achieved by proper selection of the size and shape of the decoupler and/or the orifice in the decoupler. In this way, the mount assembly can be matched to particular vibration patterns anticipated for particular exhaust system and motor vehicle body combination. Thus, an overall smoother and quieter ride may be provided.

In order to provide further passive tuning, the resilient characteristic or stiffness of the wall portions of the hollow resilient body may be varied relative to each other. For vibration isolation and noise suppression of an exhaust system, it has thus far been found that the preferred ratio of the stiffness of the first, second and third wall portions of the resilient body is approximately 2:0.25:1. It should be appreciated that where tuning for stiffer qualities and increased damping characteristics for accommodating vibration of increased amplitude, the stiffness of the second wall portion is increased, usually by simply increasing the thickness. Of course, where less damping is required, the thickness of the second wall portions may be decreased to make them more flexible. In this way, vibrations are absorbed by a mount assembly exhibiting softer characteristics.

Still other objects of the present invention will become readily apparent to those skilled in this art from the following description wherein there is shown and described a preferred embodiment of this invention simply by way of illustration of one of the modes best suited to carry out the invention. As will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing:

FIG. 1 is a cutaway perspective view showing the hydraulic mount assembly of the present invention used for mounting an exhaust system to a motor vehicle body;

FIG. 2 is an exploded longitudinal cross-sectional view of the hydraulic mount assembly shown in FIG. 1;

FIG. 3 is a longitudinal cross-sectional view of a hydraulic mount assembly of the present invention at rest;

FIG. 4 is a transverse cross-sectional view through the second resilient body member of the hydraulic mount assembly;

FIG. 5 is a longitudinal cross-sectional view similar to FIG. 3, but with the hydraulic mount assembly rotated 45° relative to FIG. 3, in order to show the cross section through the second wall portion of the first resilient body member;

FIG. 6 is a transverse cross-sectional view through the first resilient body member showing the relative thicknesses of the first and second wall portion;

FIG. 7 is a longitudinal cross-sectional view of the hydraulic mount assembly undergoing tensile loading; and FIG. 8 is a longitudinal cross-sectional view of the assembly undergoing compressive loading.

Reference will now be made in detail to the present preferred embodiment of the invention, an example of which is illustrated in the accompanying drawing.

DETAILED DESCRIPTION OF THE INVENTION

Reference is now made to FIG. 1 showing an improved hydraulic mount assembly 10 for supporting and positioning an exhaust system E relative to a motor vehicle body or frame B. The assembly 10 comprises first and second mounting members 12, 14. As shown in FIG. 1, these mounting members 12, 14 are mounted to the exhaust system E and the vehicle body B, respectively, by bolts 15 in a conventional manner. A hollow resilient body, generally designated by reference numeral 16, connects the mounting members 12, 14. The body 16 includes a first or lower resilient body member 18 and a second or upper resilient body member 20. Each body member 18, 20 is substantially bell shaped. Thus, the body member 18 includes a first cavity 22 and the second body member 20 includes a second cavity 24.

The body members 18, 20 are connected or joined together in sealing relation with the cavities 22, 24 facing each other and separated by an orifice plate 26. Preferably, the joining is completed with the body members 18, 20 submerged in a damping liquid, such as commercial antifreeze, so that the resulting closed chamber formed by the two cavities 22, 24 is completely filled with damping liquid.

The integrity of the seal between the body members 18, 20 is assured by circular mild steel inserts 28 embedded in and projecting from the members adjacent the edge of attachment. Specifically, the inserts 28 serve to rigidify the members in the attachment area. The body members 18, 20 are brought together in compression with the orifice plate 26 disposed therebetween and an extended ring portion 30 of one of the inserts 28 is mechanically deformed or crimped around the exposed portion of the other insert. Molded rubber ribs 32 positioned between each of the inserts 28 and the orifice plate 26 engage the orifice plate and act as O-rings to positively seal against fluid leakage.

The hydraulic mount assembly 10 is provided with variable damping through the provision of a decoupler 34. As is known, the decoupler 34 is positioned for reciprocal movement between the two cavities 22, 24 in the orifice plate 26. By varying the size and shape of the decoupler and/or the orifice 35 in the decoupler, the dynamic characteristics of the mount assembly 10 may be tuned so as to match the particular vibrations anticipated for a given application. Thus, when the exhaust system E reciprocates relative to the vehicle body B, the mount assembly 10 operates to effect high damping at high amplitudes and relatively low or no damping at low amplitudes. In this way, the mount assembly 10 produces the desired damping effects found best suited to isolate exhaust system vibrations from the passenger compartment of a motor vehicle.

While hydraulic mount assemblies of the type to isolate engine vibrations have generally required a separate diaphragm to control the expansion or contraction of a cavity, and thereby the damping liquid flow and damping effects of the mount, this requirement is eliminated with the simple construction of the present invention. More specifically, as shown in FIGS. 3-6, the first resilient body member 18 includes first, relatively thick wall portions 36, 36' of high stiffness, and second, relatively thin wall portions 38 of low stiffness. As shown, the first wall portions essentially comprise thickened ribs with the second wall portions of substantially triangular shape extending therebetween (see also FIG. 1). Thus, the first and second wall portions 36, 38 and 36' alternate around the body member 8.

The second body member 20 includes third wall portions of a substantially intermediate thickness and stiffness. As shown in FIGS. 4 and 6, the first wall portions 36 are substantially twice as thick (2T) and stiff as the third wall portions of the second body member 20 (T). Further, the first wall portions 36 are substantially eight times as thick and stiff as the second wall portions 38 ($\frac{1}{4}$T) formed between and interconnecting the thickened ribs. Thus, the ratio of the thicknesses of the first, second and third wall portions is substantially 2:0.25:1. It has been found that this ratio produces the desired dynamic characteristics for a mount assembly 10 utilized in isolating exhaust system vibrations and suppressing exhaust system noises from the passenger compartment of a vehicle.

The operation of the mount assembly 10 of the present invention is best shown in FIGS. 7 and 8. Tensile loading of the assembly 10 is produced by relative movement of the exhaust system E away from the vehicle body B, as shown by the action arrow A (see also FIG. 1). The first wall portions or thickened ribs 36 are of sufficiently high stiffness to prevent a dimensional change of the first body member 18 in the longitudinal direction in response to this loading. As a result, the tensile loading only causes stretching of the second body member 20 having wall portions of only intermediate stiffness.

As the second body member stretches, the volume of the second cavity 24 increases. The initial increases in the volume of the cavity 24 cause the decoupler 34 to move towards the position shown in FIG. 7. This upward movement or displacement of the decoupler 34 serves to fill the increased volume of the cavity 24 and simultaneously preempt damping liquid flow through the orifice 35. Thus at low amplitude vibration, the mount assembly 10 provides little or no damping.

Where sufficiently high amplitude vibrations are experienced, the decoupler 34 shifts upwardly toward the cavity 24 to its fullest extent and becomes seated against the orifice plate 26, as shown in FIG. 7. Further tensile loading of the mount above this level results in damping liquid flow being generated through the restricted orifice 35 from the first cavity 22 into the second cavity 24 (see flow action arrows B). This flow of hydraulic fluid is accommodated by an equal reduction in the volume of first cavity 22 through an inward flexing (note flex action arrows C) of the second, relatively thin body wall portions 38 of the first body member 18.

Upon reversal of the vibration force and movement of the exhaust system E toward the vehicle body B (see action arrow D in FIGS. 1 and 8), the mount assembly 10 is placed in compression loading. Once again, the thickened ribs 36 of the first body member 18 are of sufficiently high stiffness to prevent dimensional changes of the body member in the longitudinal direction. As a result, this compression loading only causes compression of the second body member 20.

As the second body member 20 compresses, the volume in the second cavity 24 decreases. Initial decreases in the volume of the cavity 24 cause the decoupler 34 to shift from the position shown in FIGS. 5 or 7 toward the position shown in FIG. 8. This displacement of the decoupler 34 preempts damping liquid flow through the orifice into the first cavity 22. Thus, as with tensile loading, in compression loading at low amplitude the mount assembly 10 again provides little or no damping.

Where sufficiently high amplitude vibrations are experienced, however, the decoupler 34 shifts downwardly to become seated against the orifice plate 26, and from this point on, further compression loading results in damping liquid flow being generated from the second cavity 24 through the restricted orifice 35 into the first cavity 22 as shown by flow action arrows F. The volume of the first cavity 22 must increase to accommodate this flow of fluid. This volume increase is achieved by outward flexing or bulging of the second relatively thin body wall portions 38 of the first body member 18 (see flex action arrows G).

Thus, it should be appreciated that the second body wall portions 38 of the resilient body 16 act as integral diaphragms accommodating the exchange of damping fluid between the cavities 22, 24 that creates the desired damping effect. Advantageously, these relatively thin second body wall portions 38 are inexpensively constructed by simply molding the body member 18 as a single rubber piece.

By selecting the stiffness of the wall portions 38 to be a particular value, the mount assembly can be effectively tuned. That is, the thickness of the relatively thin second body wall portions 38 may be adjusted during the molding process to provide the mount assembly 10 with desired dynamic rate and damping characteristics so as to optimize the properties of the mount for a particular application.

In summary, numerous benefits have been described which result from employing the concepts of the present invention. The hydraulic mount assembly 10 includes a resilient, elastomeric body 16 formed from two body members 18, 20 having wall portions of differential thicknesses. The thin wall portions 38 between stiff thickened ribs 36 flex in and out as the body 16 is loaded and resulting from the stretching or compressing of the body member 20. The volume increase or decreases, respectively, in the cavity 24 promotes damping liquid flow past the orifice plate 26 through the decoupler orifice 35. Advantageously, the relatively thin wall portions 38 molded integrally into the body member 18 eliminate the need for a separate diaphragm. As a result, the mount assembly 16 of the present invention is comprised of fewer parts and is less expensive to both produce and assemble. Any problems of seal integrity around the separate diaphragm utilized in prior art mounting assemblies is inherently eliminated. A highly efficient mount assembly 10 for hanging of the exhaust component E is thus provided.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the variations possible in the selected ratios of wall thicknesses, for damping adjustment are virtually infinite, and exact passive tuning of the mount assembly 16 is thus possible. In addition to a change in the thickness of the wall portion 38, a thickness change can be made in the wall portion of the body member 20 with similar tuning results. Also, the flexibility or resiliency of the wall portions may be varied by use of inserts having disparate stiffness characteristics. To add further rigidity to the ribs 36, the inserts 28 may be extended up to the mounting member 12. Thus, it should be understood that the preferred embodiment was chosen and described to simply provide the best illustration of the principles of the invention and its practical application to thereby enable one of ordinary skill in the art of utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A hydraulic mount assembly, comprising:
   first and second mounting members;
   a first resilient body member connected to said first mounting member, said first resilient body member including a first wall portion of relatively high stiffness and a second wall portion of relatively low stiffness;
   a second resilient body member connected to said second mounting member, said second resilient body member having a third wall portion of relatively intermediate stiffness and being connected to said first resilient body member so as to form a closed chamber that is filled with damping liquid;
   and an orifice plate dividing said chamber into two communicating cavities to effect damping, a first cavity being formed between said first resilient body member and said orifice plate and a second cavity being formed between said second resilient body member and said plate; the ratio of the stiffness of the first, second and third wall portions is approximately 2:0.25:1; tensile loading of said mount assembly causing said third wall portion of said resilient body to stretch and produce an increase in volume in said second cavity causing damping liquid to flow from said first cavity into said second cavity, and the second wall portion to flex inwardly to accommodate the flow of liquid; compressive loading of said mount assembly causing said third wall portion of said resilient body to bulge and produce a decrease in volume of said second cavity causing damping liquid to flow from said second cavity into said first cavity and the second wall portion to flex outwardly to accommodate the flow of liquid.

2. The hydraulic mount assembly of claim 1, wherein said first and second body members are substantially bell-shaped, said first and second wall portions alternating around said first resilient body member.

3. The hydraulic mount assembly of claim 2, wherein said first wall portions comprise thickened ribs.

4. The hydraulic mount assembly of claim 3, wherein said second wall portions are substantially triangular extending between said ribs.

* * * * *